Sept. 19, 1961 J. A. MAURER 3,001,030
SOUND REPRODUCER FOR REPRODUCING SOUND
FROM A SOUND TRACK AREA ON FILM
Filed Dec. 11, 1958 5 Sheets-Sheet 1

INVENTOR.
JOHN A. MAURER
BY
Hane and Nydick
ATTORNEYS

Sept. 19, 1961  J. A. MAURER  3,001,030
SOUND REPRODUCER FOR REPRODUCING SOUND
FROM A SOUND TRACK AREA ON FILM
Filed Dec. 11, 1958                    5 Sheets-Sheet 2

INVENTOR.
JOHN A. MAURER
BY
Hane and Nydick
ATTORNEYS

Sept. 19, 1961                  J. A. MAURER                3,001,030
SOUND REPRODUCER FOR REPRODUCING SOUND
FROM A SOUND TRACK AREA ON FILM
Filed Dec. 11, 1958                                    5 Sheets-Sheet 3

INVENTOR.
JOHN A. MAURER
BY
*Hane and Nydick*
ATTORNEYS

Sept. 19, 1961 J. A. MAURER 3,001,030
SOUND REPRODUCER FOR REPRODUCING SOUND
FROM A SOUND TRACK AREA ON FILM
Filed Dec. 11, 1958 5 Sheets-Sheet 4

INVENTOR.
JOHN A. MAURER
BY
ATTORNEYS

Sept. 19, 1961 J. A. MAURER 3,001,030
SOUND REPRODUCER FOR REPRODUCING SOUND
FROM A SOUND TRACK AREA ON FILM
Filed Dec. 11, 1958 5 Sheets-Sheet 5

INVENTOR.
JOHN A. MAURER
BY
*Haure and Nydick*
ATTORNEYS

United States Patent Office 3,001,030
Patented Sept. 19, 1961

3,001,030
SOUND REPRODUCER FOR REPRODUCING SOUND FROM A SOUND TRACK AREA ON FILM
John A. Maurer, New York, N.Y., assignor to The Kalart Company Inc., Plainville, Conn.
Filed Dec. 11, 1958, Ser. No. 779,676
21 Claims. (Cl. 179—100.3)

The present invention relates to a sound projector for simultaneously projecting photographic transparencies and sound recorded on film, and more particularly the invention relates to a sound projector for reproducing sound recorded on a slide film or strip film as disclosed in copending patent application Serial Number 561,891 filed January 27, 1956, by Morris Schwartz and Edward K. Kaprelian.

Strip or slide film as disclosed in said application comprises alternate picture areas and sound areas in longitudinal spacing. Each picture area is associated with a sound area and each pair thus formed constitutes a program to be projected and reproduced simultaneously. One or several programs may be provided on a strip of film and several programs forming pairs may be combined in a continuing presentation. A picture area and the associated sound area may be disposed directly adjacent to each other, but more often it is found convenient to intersperse picture and sound areas of several programs.

The present invention is primarily concerned with the sound reproducing components of the projector and the exemplified sound reproducing equipment which will be more fully explained hereinafter, is specifically designed for coaction with but not limited to a sound area in which the sound is recorded in the form of an assemblage of record lines extending substantially longitudinally on a strip of film, occupying for instance a space 1¼″ long and 1″ high or wide on 35 mm. motion picture film. Each record line in each sound area is inclined slightly with respect to either longitudinal edge of the film so that the right hand end of each record line is at the same distance from a reference edge of the film as the left hand end of the next line in the sequence. Hence, if a sound area is visualized as being cut transversely of the two film edges at the opposite ends of the record lines and the cut edges are joined so as to form the cut out film section into a cylinder, the record lines on the cylinder wall would constitute a continuous helical line or screw thread. Any suitable number of sequential record lines in a sound area may be provided. 80 lines or threads for the width of one inch have been found suitable and practical. The 80 lines or threads will then be spaced from center to center of adjacent lines by a distance of .0125 inch. The record lines may be photographically produced on the film by any suitable method, conventional or non-conventional. It has been found advantageous for reasons that will become apparent from the subsequent description, to provide opaque areas at the right and left hand ends of the record lines. In the example given, these opaque areas are in the form of transverse strips and extend the total length of a sound area to 1½″, and the picture areas are of the same size, that is, 1½″ by 1″.

Broadly, the object of the invention is to provide a sound projector capable of reproducing from a sound area of the aforedescribed kind sound which is substantially continuous and steady in volume, which has a satisfactory signal-to-noise ratio and which is of good naturalness and intelligibility, or in other words, sound of a frequency range sufficiently broad to satisfy reasonably exacting demands on clarity of reproduction.

More specifically, it is an object of the invention to provide in the sound reproducing equipment of the projector means for guiding a film section containing the sound area to be reproduced into a cylindrically curved predetermined position and constraining the sound area in such curved position in order to permit scanning of the record lines of the sound area by accurately focused beams of light.

Another object of the invention is to provide a novel and improved sound reproducing equipment including means for scanning the record lines by the light beams in a manner such that the beginning of the scanning of each record line coincides exactly with the end of the scanning of the next preceding line so that sound is produced continually for all practical purposes.

Still another object of the invention is to provide a novel and improved sound reproducing equipment in which the sound area to be scanned and the scanning means are maintained in an operational relationship such that the scanning beam is accurately focused upon the record lines during the entire scanning operation.

A further object of the invention is to provide a novel and improved sound reproducing equipment in which the scanned sound area is held stationary during the scanning operation and the scanning means are moved relative to the sound area at a predetermined steady rate of speed at which the scanning light beams will follow the record lines one at a time in the proper sequence and without, at any time, overlapping parts of two adjacent lines, thereby assuring a highly distinct reproduction substantially free of noise and cross talk.

A still further object of the invention is to provide a novel and improved sound reproducing equipment including means for automatically returning the scanning means from the position occupied at the end of a scanning operation into its initial position thereby readying the equipment for the next reproduction from a sound area.

It is also an object of the invention, allied with the preceding ones, to provide as part of the sound reproducing equipment a novel and improved optical system which reflects the light incidental upon it from the moving scanning beams on to a photoelectric cell so that the amount of light impinging upon the photocell is the same for all parts of the scanned sound area except as modulated by the modulations of the record lines. As a result the excitation of the photocell will follow accurately the modulations of the record lines, or in other words, it is truly indicative of the recorded sound.

Finally, it is a general object of the invention to provide a sound reproducing equipment which is simple in design, suitable for production in quantity, easily adjustable and permanent in maintaining its adjustment and which can be structurally combined with the picture projecting equipment of the apparatus in a compact and comparatively light portable structure.

Other and further objects, features and advantages of the invention will be pointed out hereinafter and set forth in the appended claims forming part of the application.

In the accompanying drawing, a preferred embodiment of the invention is shown by way of illustration and not by way of limitation.

In the drawings:

FIG. 1 is an elevational side view, partly in section, showing the sound equipment in its position at the beginning of a scanning operation.

FIGS. 2 and 3 are sections taken on line 2—2 of FIG. 1, line 3—3 of FIG. 4 respectively showing, in different operational positions, control means for controlling the motion of the scanning mechanism.

Figure 7:
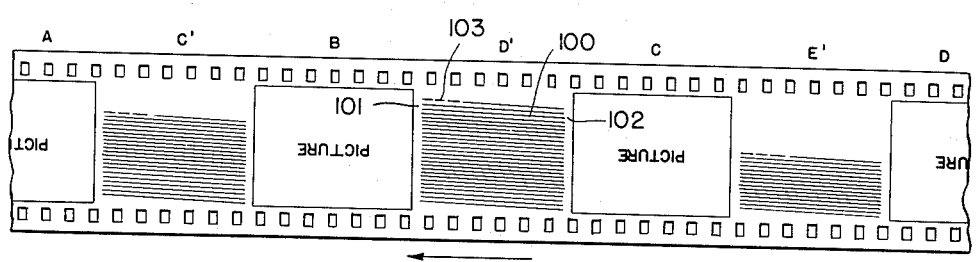
FIG. 7 is a view of a section of strip film of the kind previously described.

Referring now to the figures more in detail and first to FIG. 7, this figure shows a strip of film which carries picture areas A, B, C, D, etc. which are separated from each other by sound record areas C', D', E', etc. The sound record areas are on the strip of film in advance of the associated picture areas with reference to the direction in which the film is fed through the projector as is indicated by an arrow. While the picture areas and the sound areas alternate on the film, the associated areas are not disposed directly adjacent to each other. For instance, between picture area C and corresponding sound area C', a sound area D' and a picture area B are interposed. The picture area D associated with sound area D' is partly shown, but the sound area associated with picture area B would be to the left of the drawing. The disposition of the record lines 100 and the narrow opaque areas 101 and 102 separating each record area from the adjacent picture areas have been previously described.

Film feed assembly

Figure 6:
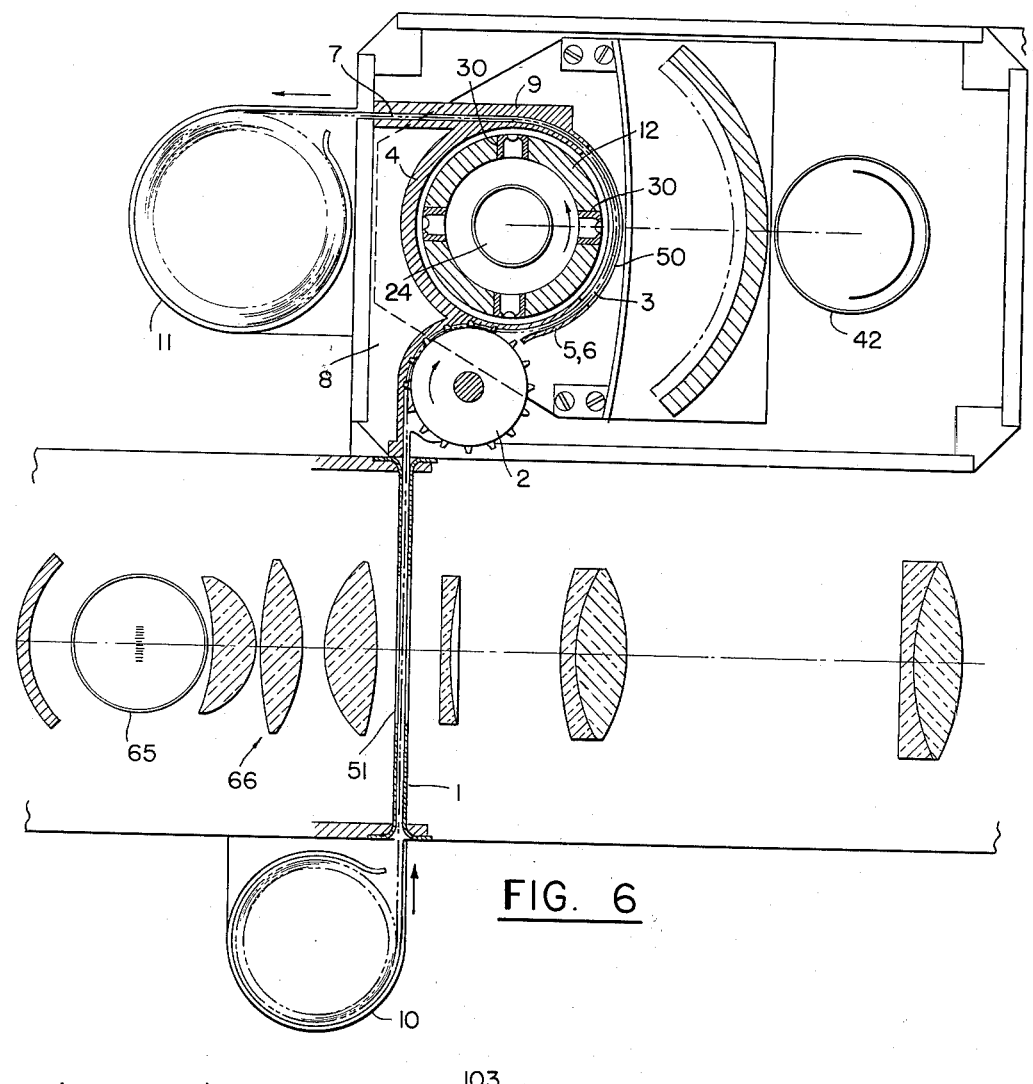
FIG. 6 is a plan view, partly in section, of the sound equipment and also of the associated picture projecting equipment of the sound projector.

Turning now to the figures showing the structure according to the invention, and first to FIG. 6, a strip of film prepared as described in connection with FIG. 7 is fed from a storage box 10 through a straight guide channel 1 past a picture gate 51 in the picture projecting part of the projector and then around a feeding sprocket 2, which by means of its teeth engages the sprocket holes of the film and pushes the film into a channel 3. This channel constitutes a guide means of circular cross section. It extends half way about a substantially cylindrical tube 4. The guide channel 3 is formed by the cooperation of correspondingly curved upper and lower guide members 5 and 6. The guide members extend inwardly into a window 50 provided in the wall of tube 4. This window is very slightly wider than the film and its top and bottom edges serve to locate the film in front of the window in semi-cylindrical configuration. A high degree of accuracy is required in respect to the location and retention of the film by the guide means. Generally the location of the film would be fixed within one or two thousandths of an inch. Upon emerging from channel 3, the film is guided into a straight channel 7 which is formed between one end of a support block 8 and a side piece 9 which is fastened to block 8 by any suitable means. Channel 7 leads the film into a take up box 11 in which it accumulates as the reproduction and projection of the film proceed.

Channels 1 and 3 and sprocket 2 are so correlated and dimensioned with respect to each other than when a given picture area is in gate 51 in the picture projecting equipment the corresponding sound record area is centered in channel 3 and window 50.

The sound record area when centered in channel 3 and window 50 faces the optical system of the sound reproducing equipment. This system collects the scanning light and directs it to a photocell 42.

Scanning assembly

Figures 1, 2, 3:
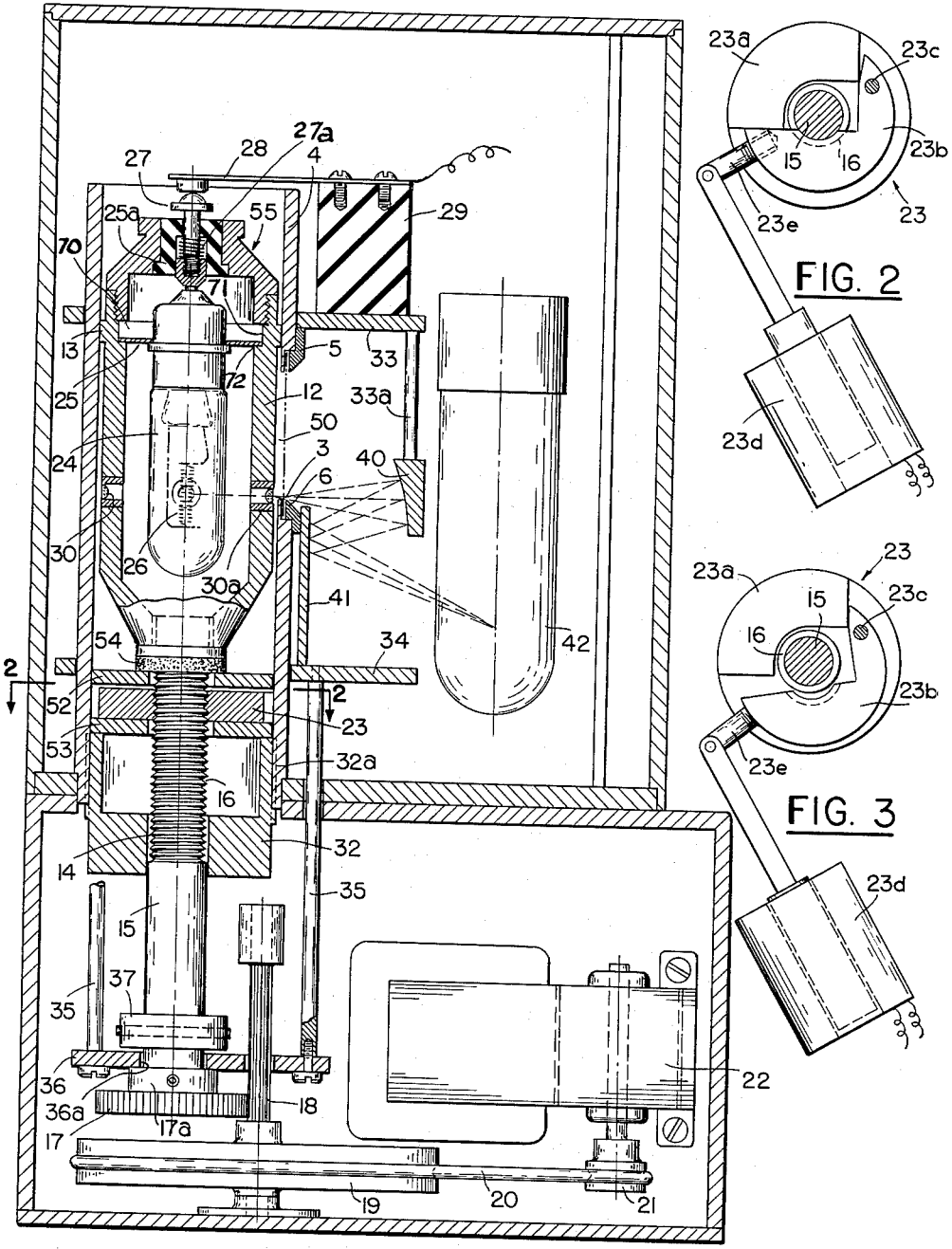

Guide channel 3 is curved and located in such a way that it is concentric with the inner and outer walls of tube 4 to a high degree of accuracy. As can be seen in FIG. 1, within tube 4 a scanning drum or cylinder 12 is mounted rotatable about an axis coaxial with the longitudinal axis of tube 4 and hence also with the longitudinal axis of channel 3 and window 50. Tube 4 should be visualized as being stationary and is generally mounted in upright position. Drum 12 is accurately guided in tube 4 by an upper bearing 13 which rests against the inner wall of tube 4 and a lower bearing 14. The drum is carried on one end of a shaft 15 on which screw threads 16 are formed. The shaft is secured to the drum for joint rotation of the drum and the shaft and is driven at a constant rate of speed by motor 22. The motor is drivingly coupled to shaft 15 by any suitable means having a suitable ratio of transmission. The transmission means are shown as comprising a small pulley 21, a belt 20, a large pulley 19, which also acts as a flywheel and gears 17 and 18.

Figures 4, 5:
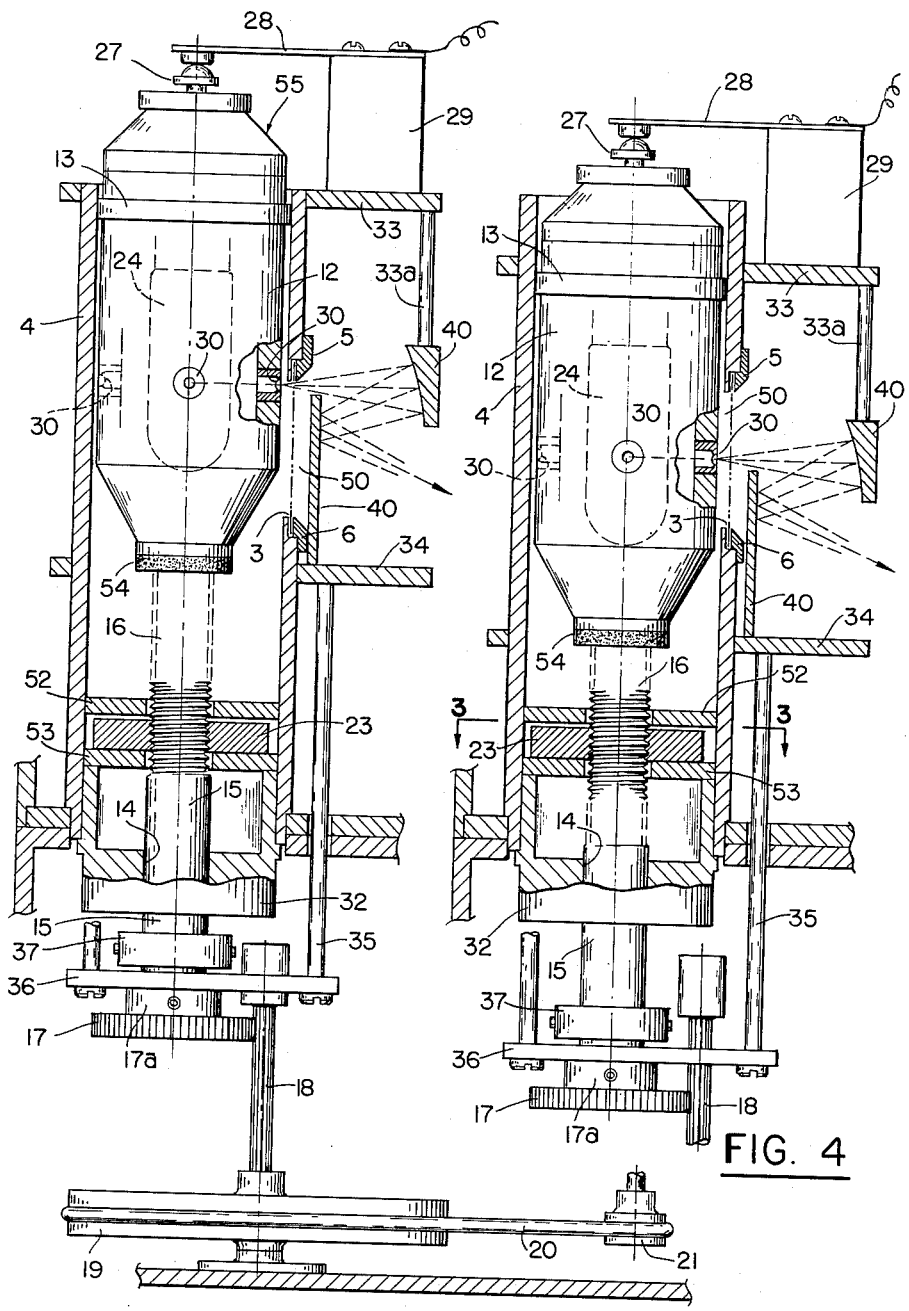
FIG. 4 is a sectional view similar to FIG. 1, showing the sound equipment in an intermediate position during a scanning operation.
FIG. 5 is a sectional view similar to FIGS. 1 and 4, but showing the scanning mechanism at the end of a scanning operation.

In order to effect an axial displacement of the drum within tube 4, in addition to the rotation of the drum by the motor, the drum assembly coacts with a second transmission means 23 which in one operational position effects axial lifting of the drum from a lowermost axial position shown in FIG. 1 to an uppermost axial position shown in FIG. 5 and in another operational position releases the assembly for return into the lowermost position. While the lowermost position is a fixed one, the uppermost position of the drum is variable as will be explained hereinafter. Transmission means 23 is shown more in detail in FIGS. 2 and 3. It comprises two parts, 23a and 23b, hinged together by means of a pivot pin, 23c, to form a split nut. When the two parts of the split nut are in the position of FIG. 2, the threads of the nut parts engage the threads 16 formed on shaft 15. The split nut 23 is located within tube 4 by means of a large nut 32 which also forms the aforementioned lower bearing 14 for shaft 15 and with it for drum 12. Nut 32 can be threaded more or less deeply into tube 4 by means of threads 32a and the split nut 23 itself is placed between an upper and lower plate 52 and 53 axially slidable within tube 4, but preventing rotation of the nut 23 relative to tube 4. The closing and the opening of the split nut as shown in FIGS. 2 and 3 respectively can be controlled by any suitable control means. There is shown a solenoid 23d which controls by means of a linkage 23e the positions of nut parts 23a and 23b relative to each other and is in turn controlled by the axial position of the drum within tube 4 as will be more fully explained hereinafter.

As is evident, engagement of the nut threads with threads 16 on shaft 15 will impart to the drum an axial displacement at a rate determined by the pitch of the engaging threads. For the purpose of this description, it is assumed that the drum moves upwardly when the split nut is closed. To permit such axial movement of the drum, gear 18 is longitudinally elongated so that gear 17 can ride along gear 18.

Opening of the split nut, that is movement of the parts thereof from the position of FIG. 2 into the position of FIG. 3, frees shaft threads 16 from engagement with the split nut parts. As a result, the drum will return by its own weight from its raised position within tube 4 (see FIGS. 4 and 5) into the lowermost position of FIG. 1. The lowermost position of the drum is determined by the position of upper plate 52 in reference to tube 4. To cushion the impact of the drum upon plate 52, a soft washer 54 is provided at the lower end of the drum which will come in engagement with plate 52 when the drum descends.

The control of split nut 23 is preferably so arranged that the split nut is closed when the solenoid is de-energized and is opened upon energization of the solenoid. A spring may be provided to urge the parts of the split nut into the closed position. The control of the energizing circuit of the solenoid will be more fully explained hereinafter.

The scanning drum houses a lamp 24 having preferably a longitudinally disposed incandescent filament 26.

The lamp 24 is attached, as, for example, by means of solder, to a metal disc 25, in which it is adjusted prior to being attached in such a way that the filament 26 is on an axis perpendicular to the plane of disc 25 at its center.

Disc 25 is adapted to be dropped into, and to fit closely, a recess 70 which is turned in the upper part of drum 12 so that its lower edge 72 is in a plane perpendicular to the axis of the drum and its cylindrical part 71 is coaxial with it.

A cap 55 is threaded to screw into the top of drum 12, which is fitted with matching threads. An insulating sleeve 25a is pressed into the cap 55. In it is mounted a contact 27 which is pressed downward by a spring 27a.

When the lamp 24 is inserted into the drum 12 so that the attached disc 25 is seated in the recess 70 and the cap 55 is screwed into place as shown in the top of drum 12, the contact 27 is forced into contact with the center contact of the base of the lamp by the spring 27a, and therefore the face of the disc 25 is forced into contact with the plane surface 72, while the edge of the disc is substantially in contact with the cylindrical part 71 of the recess 70. Thus the filament 26 of lamp 24 is constrained to lie on the axis of drum 12.

The contact 27 is engaged by a contact spring 28 carried on an insulating support 29. Spring 28 is connected to a suitable source of current, which is thus brought to the center contact of the lamp through contact 27. The other terminal of this source of current is attached to the body of the machine, and is connected to the lamp through drum 12 and the disc 25.

The lens system for directing the scanning beam or beams upon the sound area placed in scanning gate or window 50 are mounted in the wall of drum 12. The lens system is shown as comprising several small lenses 30 which are superimposed in a plane at the right angles to the axis of rotation of drum 12 at circumferentially equal intervals. It has been found to be most advantageous to provide four lenses which are spaced apart at accurate 90° intervals. Each lens is held in a small lens mount 30a which can be radially adjusted by means of fine screw threads for the purpose of focusing the lenses. Each lens is accurately focused upon the record lines on the emulsion surface of the film. The lenses are so designed that they have a very short focus and that the images of the filament 26 of lamp 24, as seen by the lenses, are reduced to very fine and very short lines. In a practical embodiment of the invention, the lenses have a focal length of approximately one twenty-fifth of an inch and the images of the filament are reduced to lines of light which measure approximately one-half thousandth of an inch in width and nine thousandths of an inch in length. The radius of channel 3 is preferably made such that when the record area of the film is centered in it, the length of the sound record lines subtends an angle of 90° as seen from the axis of tube 4 which is also the axis of rotation of drum 12.

From the above relationships it may be seen that, given the correct pitch of screw threads 16 which in the practical embodiment of the invention is twenty threads per inch, and assuming that the position of the split nut 23 is adjusted correctly, as the drum 12 rotates and advances axially, each line of the sound record area will be swept along its length by one of the four images of filament 26 as formed by lenses 30. Exactly at the instant when each image comes to the end of a record line, the next image comes to the beginning of the next higher record line due to the aforedescribed inclination of the record line relative to the longitudinal edges of the film and starts to scan such next record line. As a result, the scanning of the record lines is practically continuous from beginning to end. As is apparent, only one image is actively scanning at any one time except at the instant of transition from one line to the next when two are in use. The three scanning images which are not in use except at the aforementioned instant of transition are prevented from reaching the film by the opaque wall of tube 4. As previously mentioned, window or gate 50 is slightly longer than the exact length of the record lines so as to allow the scanning to proceed properly even if the sound record area is not centered perfectly. There is, therefore, a cetain period of time near the instant of transition when two of the images formed by two of the lenses are within the area of gate 50. However, only one of the images is able to transmit light through the film because the other—the one which is about to begin to scan a record line or which has just finished scanning a line—is blocked by one of the opaque strips 101 or 102 on the film.

As is evident, high quality scanning requires that the images travel along the record lines rather than falling partly or wholly between them. The images can be adjusted in relation to the sound record lines by adjusting the position of split nut 23 within tube 4 by screwing nut 32 more or less deeply into tube 4.

Each beam of light which emerges from the convex side of the film as the film is being scanned diverges at an angle of the order of 30°. Each beam, moreover, sweeps through a horizontal angle of 90° and rises progressively as the scanning takes place. In the example given, the total rise of the beams is through a distance of one inch. Each beam, after being modulated by the record lines, impinges upon the light sensitive area of a photocell 42. This photocell is suitably mounted in the projector stationarily relative to the drum. There are available photocells which have a light sensitive area in excess of a length of one inch, so that the beams will fall upon the light sensitive area during the entire upward movement of the drum through a distance of one inch. However, as is evident, the length of the light sensitive area of a photocell as readily available, imposes a limitation upon the height or width of the sound record area that can be reproduced. Accordingly, it has been found advantageous to provide an optical system which moves together with drum 12. Such movable optical system is shown as comprising a toroidal mirror 40 and a suitably shaped mirror 41 which may be cylindrical. Both these mirrors are mounted in staggered relationship on a carriage which moves up and down together with drum 12 so that the horizontal center line of mirror 40 is always at the same height as the lenses 30, or in other words, coplanar with the plane of the lenses. The carriage comprises an upper plate 33 from which mirror 40 is suspended by one or several studs 33a, a lower plate 34 which supports mirror 41, two or more upright rods 35 and a follower plate 36. Plate 36 has a center hole 36a slightly larger than the diameter of shaft 15. Plate 36 is placed on the shaft between the hub 17a of gear 17 and a suitably secured collar 37. The space between gear 17 and collar 37 is just enough to allow freedom for shaft 15, gear 17 and collar 37 to turn. When gear 17 is rotated by gear 18 to impart the scanning movement to the drum, the carriage which supports mirror 40 and 41 is moved upward by the aforedescribed combined action of screw threads 16 and split nut 23 at the same rate as the scanning drum 12 is moved upward. Hence, the vertical relationship of lenses 30 and toroidal mirror 40 always remain the same.

As appears from the previous description, the scanning operation is completed when the drum has reached an axial position within tube 4 such that one of the lenses 30 has swept the uppermost record line, the scanning starting with the lowermost record line as shown in the figures. FIG. 1 shows the drum in the lowermost position, that is, at the beginning of a scanning operation, FIG. 4 shows the drum and with it the carriage in an intermediate position and FIG. 5 shows the drum in the position in which the scanning operation has been completed. In order to return the drum and with it the carriage from the position of FIG. 5 into the position of FIG. 1 to ready the scanning assembly for a new scanning operation, the upward drive of the drum must be terminated without stopping the rotation of the drum if a further scanning operation is to follow substantially immediately to the scanning operation just completed. As previously described, the upward movement is transmitted to the drum by the engagement of the split nut 23 with threads 16. Hence, release of this engagement will terminate the upward movement of the drum and also free the drum and the components associated therewith for return by its own weight into the initial position in which it is stopped by engagement of soft washer 54 with plate 52.

The release of the split nut can be effected by any suitable means. It can be accomplished by mechanical means such as a catch which is tripped by engagement with the drum when the latter reaches a predetermined axial position closing contacts which in turn close an energizing circuit for solenoid 23d previously described. Arrangements of this kind are well known in the related art and hence it is believed that a detailed description thereof is not essential for the understanding of the invention. While the described arrangements are effective, they limit the release of the drum for return into the initial lowermost position to the drum reaching a fixed axial position in reference to tube 4. In actual practice, the record lines do not necessarily occupy the entire width or height of the film (assumed to be one inch in the example) and hence release of the drum in a fixed axial position would cause a longer or shorter period of silence following the completion of the sound reproduction before a new reproduction can begin and such intervening period of silence is not always desirable. Accordingly, it has been found preferable to provide means by which the split nut is released upon completion of the sound reproduction. These means basically comprise a signal producing record line following the uppermost record line 100 of the sound record area. This signal producing record line is indicated in FIG. 7 by a dashed line 103 and produces a signal. A twenty-five cycle signal has been found suitable. This signal is picked up by the photocell and transmitted through an amplifier 60 to a resonant circuit 61 which through a relay 62 controls the energization of solenoid 23a and energizes the solenoid for a period of time sufficient to free shaft 15. Circuit arrangements of the just described kind are well known in the art and hence need not be described in detail for the understanding of the invention.

Figure 8:
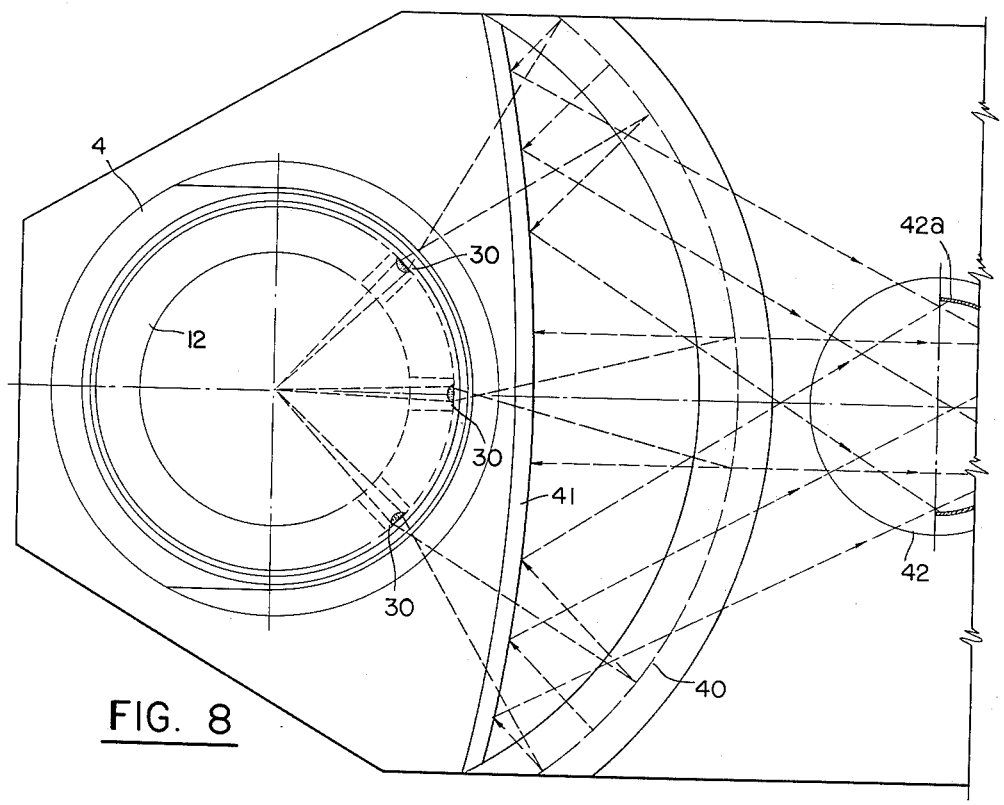
FIG. 8 is a diagrammatic enlarged view of the optical assembly of the sound equipment according to the invention.
Figure 9:
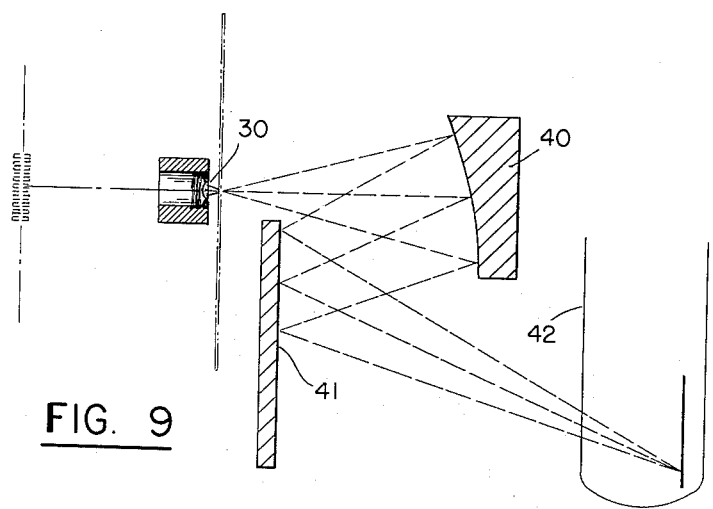
FIG. 9 is a sectional view of FIG. 8.
Figure 10:
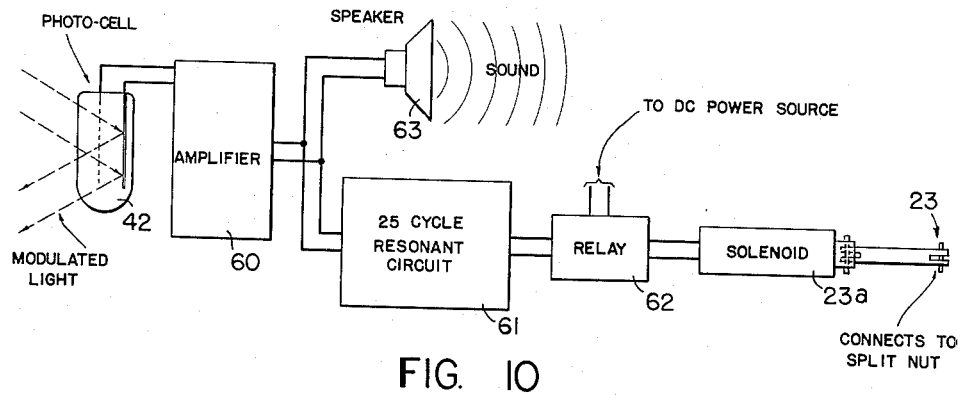
FIG. 10 is a diagram of a circuit system suitable for controlling the control means of FIGS. 2 and 3.

FIGS. 8 and 9 show, in detail, the optical path of the light beams as modulated by passing through the sound record area. As is shown in these figures, the optical system formed by mirrors 40 and 41 picks up light from the scanning of every part of the record area and directs it upon the light sensitive area in photocell 42. The center of the curvature of toroidal mirror 40 in the horizontal direction is on the axis of tube 4 and hence also on the axis of rotation of scanning drum 12. Thus, all the beams of light from the lenses 30 will impinge radially upon the surface of mirror 40 during the entire scanning operation and therefore will be reflected directly back toward the center of curvature of mirror 40. As the reflecting surface of mirrow 40 is downwardly inclined, the bundles of light are directed downwardly, as shown in FIG. 9, and impinge on mirror 41. After a second reflection from this mirror, they are all directed toward the light sensitive surface 42a of photocell 42, as shown in FIG. 8. This figure also shows that the surface of film in channel 3 and the mirror 40 are curved about the same vertical axis. Accordingly, all parts of mirror 40 are at the same distance from the points in a scanned record line from which they receive light. The shorter radius of curvature of toroidal mirror 40 which can best be seen in the sectional view of FIG. 9, is chosen so that the scanning images are all reimaged upon the light sensitive surface of the photocell. Thus, the scanning light beam from any of the lenses 30 during the scanning of any one of the record lines will always fall upon the sensitive surface of the photocell in the form of a horizontal strip, the vertical dimension of which is determined by the action shown in FIG. 9 and the horizontal dimension of which is determined by the action shown in FIG. 8.

The light modulated signals picked up by the photocell are fed to amplifier 60 which is connected to a loudspeaker 63 in a well understood manner. Amplifier 60 may be the same amplifier that is used for controlling the operation of solenoid 23a.

Upon completion of a scanning operation and return of the drum from its position of FIG. 5 into the position of FIG. 1, the same program may be repeated or, the reproduction and projection respectively of a new program may be initiated. This is effected by turning sprocket 2 until a new sound record area and a new picture area are centered in gates 50 and 51 respectively. Sprocket 2 may be turned by hand or by an automatic transport arrangement similar to that described in connection with the control of split nut 23 and controlled by the axial position of the drum in tube 4.

Figure 11:
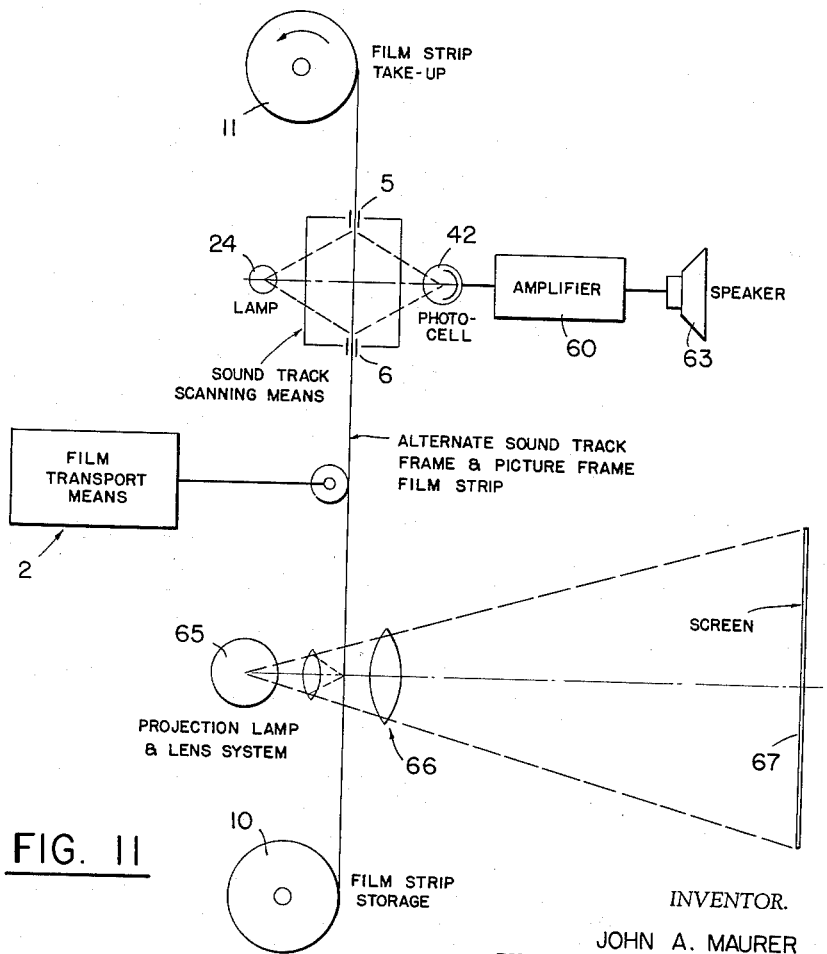
FIG. 11 is a diagram of the sound reproducing and picture reproducing equipment of the sound projector, shown more in detail in the preceding figures.

The picture projecting equipment of the projector does not constitute part of the present invention. It is shown diagrammatically in FIG. 11 and more specifically in FIG. 6. It comprises a projection lamp 65 and a lens system 66 of suitable design. The pictures may be projected upon a screen 67.

The presentation of a program in the form of a sound record area and an associated picture area is generally evident from the previous description.

As a first step, a strip film of the kind shown in FIG. 7 is inserted in the projector so that the desired sound record area and the picture area are centered in gates 50 and 51 respectively. Motor 22 is then started and will cause the drum to rotate and also to advance upwardly. Upon completion of the scanning operation (see FIG. 5) signal 103 will cause drum 12 to return into the position of FIG. 1. A new program is then started by turning sprocket 2, either manually or automatically. The cycle is repeated until the entire strip is transported into storage box 11 or motor 22 is stopped.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a device for reproducing sound from a sound record area formed on a section of film by parallel record lines, cylindrically curved stationary guide means for supporting and constraining in a predetermined position a curved film section having a sound record area thereon, and a scanning assembly including a source of light and optical means for directing a beam of light upon the sound record area supported in said guide means, said optical means being rotatable about and axially displaceable along the center axis of said guide means, and drive means drivingly coupled with said optical means for imparting to the same a combined rotary and axial motion, the rates of said rotary and said axial motions being so correlated that said beam sequentially scans said parallel record lines.

2. A device according to claim 1 and further comprising stop means controlled by said optical means reaching an axial position in which said beam of light scans a predetermined portion of said sound record area and controlling said drive means to stop the axial displacement of the optical means in said axial position thereof.

3. In a device for reproducing sound from a sound record area formed on a section of film by parallel record lines, in combination, cylindrically curved stationary guide means for supporting and constraining in a predetermined position a curved film section having a sound area thereon, and a scanning assembly including a lens means, a support means supporting said lens means and mounted rotatable about and slidable along the center axis of said guide means, a socket for receiving a light source mounted coaxially with said guide means, said lens means being focused to direct a beam of light incident from said light source upon the record lines of the sound area supported by said guide means, and drive means drivingly coupled with said support means for imparting to the same and the lens means simultaneously a rotary motion and an axial motion between an initial axial limit position and a terminal axial limit position relative to said guide means whereby said light beam sequentially scans the parallel record lines of the sound area.

4. In a device for reproducing sound from a sound record area formed on a section of film by parallel record lines, in combination, cylindrically curved stationary guide means for supporting and constraining in a predetermined position a curved film section having a sound area thereon, and a scanning assembly including a lens means, a support means supporting said lens means and mounted rotatable about and slidable along the center axis of said guide means, a socket for receiving a light source mounted on said support means coaxially with said guide means, said lens means being focused to direct a beam of light incident from said light source upon the record lines of the sound area supported by said guide means, drive means coupled with said support means for imparting to the same and the lens means a rotary motion and also an axial motion between an initial axial limit position and a terminal axial limit position relative to said guide means whereby said light beam sequentially scans the parallel record lines of the sound area, and release means controlled by said support means reaching a predetermined axial position and coacting with said drive means to terminate further axial motion of the support means by the drive means.

5. In a device for reproducing sound from a sound record area formed on a section of film by parallel record lines, in combination, cylindrically curved stationary guide means for supporting and constraining in a predetermined position a curved film section having a sound area thereon, and a scanning assembly including a lens means, a support means supporting said lens means and mounted rotatable about and slidable along the center axis of said guide means, a socket for receiving a light source mounted on said support means coaxially with said guide means, said lens means being focused to direct a beam of light incident from said light source upon the record lines of the sound area supported by said guide means, drive means coupled with the support means for imparting to the support means and the lens means a rotary motion, coupling means coupling said drive means and said support means for imparting to the latter and the lens means also an axial motion relative to the guide means, the combined rotary and axial motion of the lens means causing the light beam sequentially to scan the record lines, and control means controlled by said support means reaching a predetermined axial position and controlling said coupling means to stop said axial motion by the drive means thereby terminating the scanning operation.

6. In a device for reproducing sound from a sound area formed on a section of film by parallel record lines, in combination, cylindrically curved stationary guide means for supporting and constraining in a predetermined position a curved film section having a sound area thereon, and a scanning assembly including a lens means, a support means supporting said lens means and mounted rotatable about and slidable along the center axis of said guide means, a socket for receiving a light source mounted on said support means coaxially with said guide means, said lens means being focused to direct a beam of light incident from said light source upon the record lines of the sound area supported by said guide means, drive means coupled with said support means for imparting to the same and the lens means a rotary motion, coupling means releasably coupling said drive means and said support means for imparting to the latter and the lens means also an axial motion relative to the guide means, the combined rotary and axial motion of the lens means causing the light beam sequentially to scan said record lines, and coupling release means controlled by said support means reaching a predetermined axial position to release said coupling means whereby the support means are freed for return into the initial axial position relative to the guide means to terminate the scanning operation.

7. In a device for reproducing sound from a sound record area formed on a section of film by parallel record lines, in combination, a cylindrical housing having a window in its wall, a guide means for stationarily supporting the film section having the sound area thereon in curved configuration matching the curvature of the housing wall and aligned with said window, and a scanning assembly including a lens means, a support means supporting said lens means and mounted rotatable and slidable within said housing coaxially with the center axis thereof, a socket for receiving a light source mounted on the support means coaxially with the housing, said lens means being focused to direct a beam of light incident from said light source upon the record lines of the sound area supported by said guide means, a drive shaft extending from said support means, drive means, first transmission means coupling said drive means to said drive shaft for imparting a rotary motion to said support means, releasable second transmission means for coupling said drive means to said drive shaft to impart to said support means an axial motion relative to the guide means, the combined rotary and axial motion of the support means causing said light beam to revolve about and move along said center axis thereby sequentially scanning the parallel record lines of said sound area, and control means controlled by said support means reaching a predetermined axial position and controlling said second transmission means for releasing the same from the drive shaft, release of said second transmission means terminating said axial motion of the support means thereby completing the scanning operation.

8. In a device for reproducing sound from a sound record area formed on a section of film by parallel record lines, in combination, a cylindrical housing having a window in its wall, a guide means for stationarily supporting the film section having the sound area thereon aligned with said window in curved configuration matching the curvature of the housing wall, and a scanning assembly including a lens means, a support means supporting said lens means and mounted rotatable and slidable within said housing coaxially with the center axis thereof, a socket for receiving a light source mounted on the support means coaxially with the housing, said lens means being focused to direct a beam of light incident from said light source upon the record lines of the sound area supported by said guide means, a drive shaft extending from said support means coaxially with the housing, drive means, first transmission means coupling said drive means to said drive shaft for imparting a rotary motion to said support means, releasable second transmission means for coupling said drive means to said drive shaft to impart to said support means an axial motion from an initial axial position relative to the guide means toward a predetermined axial position, the combined rotary and axial motion of the support means causing said light beam to revolve about and move along said center axis thereby sequentially scanning the parallel record lines of said sound area, and control means controlled by said support means reaching the predetermined axial position and controlling said second transmission means for disengaging the same from the drive shaft, disengagement of the drive shaft freeing the support means for return into said initial axial position thereby terminating the scanning operation and readying the scanning assembly for another scanning operation.

9. In a device for reproducing sound from a sound area formed on a section of film by parallel record lines, in combination, a cylindrical housing having a window in its wall, a guide means for stationarily supporting a film section having the sound area thereon aligned with said window in curved configuration matching the curvature of the housing wall, and a scanning assembly including a scanning drum rotatable and slidable within said housing coaxially with the longitudinal center axis thereof, several lenses mounted in the drum side wall in a plane at a right angle to the axis of rotation of the drum and circumferentially spaced by equal intervals, a socket mounted in said drum for receiving an incandescent light bulb and maintaining a filament thereof coaxially with the drum axis, each of said lenses being focused to direct a beam of light upon the record lines of said sound area supported by the guide means, a drive shaft extending from said drum coaxially therewith, drive means, first transmission means coupling said drive means to said drive shaft for imparting a rotary motion to said drum, releasable second transmission means for coupling said drive means to said drive shaft to impart to said drum an axial motion relative to the guide means, the combined rotary and axial motion of the drum causing each of said light beams to revolve about and move along said center axis thereby sequentially scanning the parallel record lines of said sound area, and control means controlled by said drum reaching a predetermined axial position and controlling said second transmission means for releasing the same, release of said second transmission means terminating said axial motion of the drum thereby completing the scanning operation.

10. In a device for reproducing sound from a sound area formed on a section of film by parallel record lines, in combination, a cylindrical housing having a window in its wall, a guide means for stationarily supporting a film section having the sound area thereon aligned with said window in curved configuration matching the curvature of the housing wall, and a scanning assembly including a scanning drum rotatable and slidable within said housing coaxially with the longitudinal center axis thereof, several lenses mounted in the drum side wall in a plane at a right angle to the axis of rotation of the drum and circumferentially spaced by equal intervals, a socket fixedly mounted in said drum for movement in unison therewith for receiving an incandescent light bulb and maintaining a filament thereof coaxially with the drum axis, each of said lenses being focused to direct a beam of light upon the record lines of said sound area supported by the guide means, a drive shaft extending from said drum coaxially therewith, drive means, first transmission means coupling said drive means to said drive shaft for imparting a rotary motion to said drum, releasable second transmission means for coupling said drive means to said drive shaft to impart to said drum an axial motion from a lower limit position to an upper limit position, said lower and upper limit position representing the beginning and the completion respectively of a scanning operation, the combined rotary and axial motion of the drum between said two positions causing each of said light beams to revolve about said center axis thereby sequentially scanning the parallel record lines of said sound area along the length thereof, and control means controlled by said drum reaching the upper limit position and controlling said second transmission means for releasing the same, release of said second transmission means freeing said drum for return into the lower limit position.

11. A device according to claim 10 wherein the record lines in said sound area extend generally longitudinally on a strip of film and are inclined in reference to a longitudinal edge of the film strip so that one end of each record line is at the same distance from said edge as the opposite end of an adjacent reference line, and wherein the circumferential lengths of the record lines in a sound area supported in said curved position by said guide means are so correlated that the completion of the scanning of one record line by one beam and the beginning of the scanning of the next adjacent record line by the sequentially following beam substantially coincide.

12. A device according to claim 10 wherein said drive shaft is externally threaded, and wherein said second transmission means comprises a threaded member movable between a position engaging said shaft for transmission of axial motion and a disengaged position for release of the shaft, said control means when actuated moving said threaded member into the release position.

13. A device according to claim 12 wherein said threaded member is in the form of a split nut mounted axially adjustable in said housing and having two parts movable relative to each other for moving said nut into the motion transmitting position and the release position respectively, and wherein said control means are linked to at least one of said parts for moving said part into the release position in response to said drum reaching its upper limit position.

14. A device according to claim 10 wherein said first transmission means comprises a gear train including an axially elongated driving gear mounted rotatable but axially stationary in reference to said housing and a driven gear fixedly mounted on said shaft thereby allowing axial displacement of the shaft while the same is rotated.

15. A device according to claim 10 wherein said second transmission means comprises electrically operated release means, and wherein said control means comprises electronic means connected in circuit with said release means for operating the same in response to a signal received from said sound area.

16. A device according to claim 15 wherein said record lines include a record line portion generating a signal in response to being scanned by one of said light beams, said signal effecting response of said electronic means thereby terminating the scanning operation.

17. A device according to claim 3 and further comprising a stationarily mounted photocell including a light sensitive area for impingement by said light beam after the beam has transversed the sound area, amplifying means connected to the output of said photocell, and a loud speaker connected to the output of said amplifying means.

18. A device according to claim 17 and also comprising an optical system interposed between said guide means and said photocell and mounted displaceable parallel to said center axis, and means drivingly coupling said optical system with said drive means for displacement of said system simultaneously with the axial displacement of said support means and at the same rate, said optical system deflecting the beam emanating from the record lines in said sound area upon the light sensitive area of the photocell in each axial position of the support means.

19. A device according to claim 18 wherein said optical system comprises a first mirror and a second mirror longitudinally staggered in reference to the guide means and the light sensitive area of the photocell, said first mirror having a reflecting surface facing said guide means and positioned to deflect the incident revolving light beam upon the second mirror and the second mirror having a reflecting surface facing said light sensitive area and positioned to deflect the light beam incident upon it to said sensitive area in any of the axial positions of the support means and the optical system relative to said light sensitive area.

20. A device according to claim 19 wherein the reflecting surface of said first mirror has a cylindrical curvature, the center axis of which coincides with said center axis and also a toroidal curvature inclined and curved to deflect the incident light upon the reflecting surface of the second mirror, said reflecting surface of the second mirror deflecting the light incident thereupon to the light sensitive surface of the photocell.

21. A device according to claim 8 and further comprising a stationarily mounted photocell including a light sensitive area for impingement by said light beam after the beam has transversed said sound area, amplifying means connected to the output of the photocell, a loud speaker connected to the output of the amplifying means, an optical system interposed between said guide means and said photocell and mounted displaceable parallel to said center axis, and means drivingly coupling said optical system with said second transmission means, said optical system deflecting the light beam as modulated by traversing the sound area upon the light sensitive area of the photocell in any of the axial positions of the support means and the optical system.

References Cited in the file of this patent
UNITED STATES PATENTS

| | | |
|---|---|---|
| 1,734,248 | Eldred | Nov. 5, 1929 |
| 2,484,881 | Fuschi | Oct. 18, 1949 |
| 2,492,696 | Heurtier | Dec. 27, 1949 |
| 2,522,078 | Walker | Sept. 12, 1950 |